E. W. DUNBAR.
WELT STRIP AND METHOD OF MAKING SAME.
APPLICATION FILED OCT. 20, 1919.
1,375,283. Patented Apr. 19, 1921.
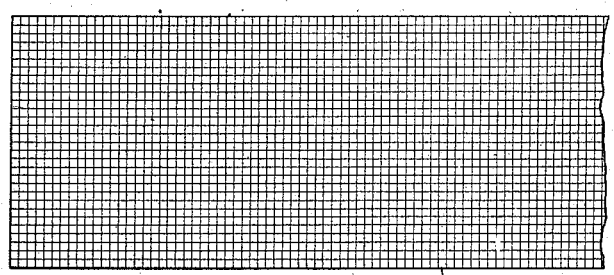
Fig. 1.
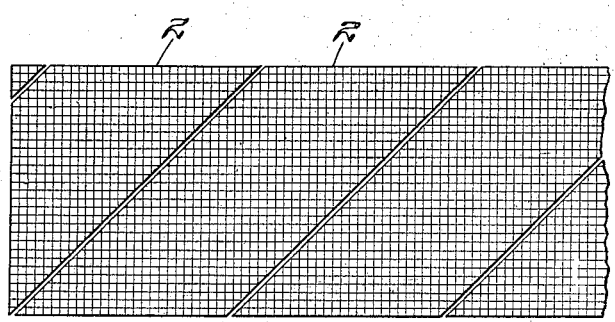
Fig. 2.
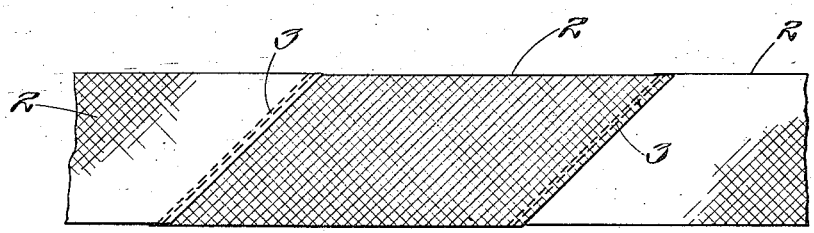
Fig. 3.
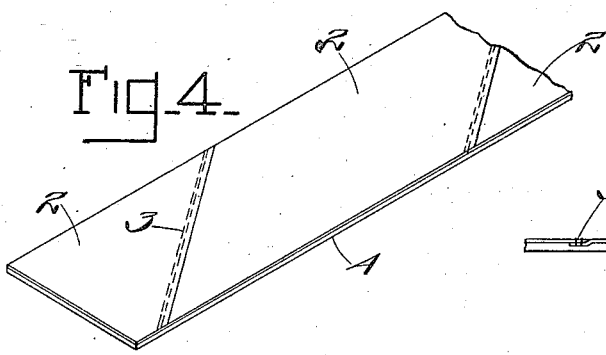
Fig. 4.
Fig. 5.
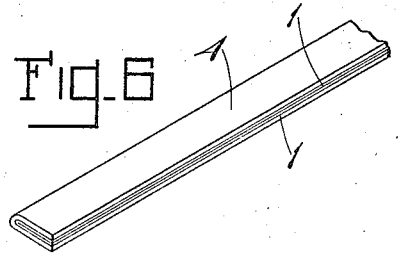
Fig. 6.
INVENTOR:
Ernest W. Dunbar
by Macleod, Calver, Copeland & Dike
Attys.

UNITED STATES PATENT OFFICE.

ERNEST W. DUNBAR, OF HUDSON, MASSACHUSETTS, ASSIGNOR TO APSLEY RUBBER COMPANY, OF HUDSON, MASSACHUSETTS, A CORPORATION OF MASSACHUSETTS.

WELT-STRIP AND METHOD OF MAKING SAME.

1,375,283.

Specification of Letters Patent.

Patented Apr. 19, 1921.

Application filed October 20, 1919. Serial No. 332,058.

*To all whom it may concern:*

Be it known that I, ERNEST W. DUNBAR, a citizen of the United States, residing at Hudson, county of Middlesex, State of Massachusetts, have invented a certain new and useful Improvement in Welt-Strips and Methods of Making Same, of which the following is a specification, reference being had therein to the accompanying drawings.

The invention relates to an improvement in welt strips. It has special reference to a welt strip made of rubberized cloth coated with rubber for use in the manufacture of fiber cored rubber welts for shoes and more especially canvas shoes of the type described in an application filed by me September 25, 1919, Serial No. 326,323. The welt which forms the subject of said prior application consists of an upper and an under layer of rubber having a core of fibrous material which extends the full width of the welt and is formed by applying to one face of a strip or sheet of rubberized cloth a coating of rubber and then doubling over the strip upon itself with the rubber on the outside, so that there is a rubber facing at the top and at the bottom and on one edge and a fibrous core consisting of the doubled-over fibrous portion of the strip. The present invention relates to a strip of material and the method of making same out of which a welt of the general character above described may be made.

In the making of the welt strip, a sheet of rubberized fabric of considerable greater width than the finished welt strip, has a rubber coating applied thereto, and then the wide sheet is slit up into strips of the requisite width to be folded to make a welt.

If the sheet from which the welt strips are coated is slit lengthwise of the sheet, that is parallel with the lines of the threads, a long welt strip may be made as long as the entire sheet which forms the bolt of cloth, to which the rubber coating is applied, and then this welt strip may be cut up into suitable lengths as desired for the individual welts. This is the manner in which I have heretofore made the welt strips. I find, however, that it is much more desirable to have the fabric cut bias so that the fabric core will be on the bias to prevent stretching. As the ordinary sheets of fabric which are employed for this purpose are only about three feet in width, although a good many feet in length, if the sheet is stripped by cutting it bias each strip will be only about four and one-half feet long, and therefore if the entire sheet has been rubberized and then coated with rubber before it is stripped, then when it is stripped there will be a lot of short strips, and in cutting up the short strips into lengths suitable for individual welts there will be a lot of waste material in addition to the necessity of handling a large number of short strips. One object of the present invention is to provide a long rubber-coated welt strip in which the rubber core is cut bias, so that the welt strip may be wound up if desired on a reel and then unrolled therefrom to cut off the individual welts desired, without having to handle a large number of short strips at the time of cutting off the welts.

In carrying out this invention I rubberize the entire sheet, then cut it bias into strips, then place these strips end to end and unite them together by stitching, or any other suitable means, thus forming one long strip as long as desired of rubberized fabric. I then apply the coating of rubber to the entire strip made up of the plurality of connected strips making a finished smooth rubber coating on one side, and then if desired I strip this up into narrower widths.

The invention will be fully understood from the following description when taken in connection with the accompanying drawings, and the novel features thereof will be pointed out and clearly defined in the claims at the close of this specification.

In the drawings, Figure 1 is a view of a rubberized canvas sheet.

Fig. 2 shows the sheet cut into strips on the bias.

Fig. 3 is a view showing the bias cut strips of Fig. 2 united in lengthwise series.

Fig. 4 is a perspective view showing the strip of Fig. 3 after it has been coated with rubber on one face.

Fig. 5 is an edge view of the strip shown in Fig. 4.

Fig. 6 shows a completed and folded welt strip made out of a section cut from the strip shown in Fig. 4 to form a fibrous cored welt.

Referring now to the drawings, 1 designates a sheet of rubberized fabric suitable for the core, and which is rolled into a bolt, said sheet having been already rubberized in a well-known manner. Assuming that this sheet is say three feet in width, it is first cut into sheets or strips by cutting it bias. Preferably it is cut into wide strips 2 about twelve inches in width. These strips thus formed are then placed end to end, the adjacent strips being slightly overlapped and united together by any suitable means, for instance as indicated by the line of stitches 3, that is the strips being made to overlap sufficient to enable them to be properly united. Preferably two or more lines of stitches are employed. This will make a long sheet about three times the length of the original sheet and about twelve inches wide. This long sheet is then coated with rubber over the entire length. The rubber coating 4 will cover up on the face side the joints between the several connected sections of the cloth, thus making a long strip several times the length of the original sheet with a smooth exterior surface on the rubber coated side, and the fabric being on the bias its entire length. This long strip may be further stripped up into suitable strips of the requisite width for the welts. For instance, if the finished and folded welt is to be one-half inch in width then the rubber coated strip or sheet will be slit up into strips one inch wide to allow for the strip to be doubled over to form a cored welt of one-half inch width. This long strip of one inch width can be rolled onto a reel ready for use, and can from there be run off to the machine which will cut it into pieces of the requisite length for individual welts as fast as they are desired for use.

What I claim is:—

1. A welt strip for making rubber welts with fibrous core, consisting of a long strip composed of a plurality of sections of rubberized fabric with the fibers extending on the bias, said sections being spaced in lengthwise series and united together at their adjacent ends, and a continuous coating of rubber on one face of the strip of united sections in such manner as to form a smooth exterior surface on the rubber side.

2. The method of making a welt strip for use in making fiber cored rubber welts, consisting of stripping a sheet of rubberized fabric on the bias to form a plurality of strips of uniform width, each with the fibers on the bias, uniting together in lengthwise series the several strips thus produced to form a continuous bias strip, then coating one face of the compound strip with a continuous coating of rubber.

In testimony whereof I affix my signature.

ERNEST W. DUNBAR.